(12) United States Patent  (10) Patent No.: US 9,124,998 B2
Sasaki et al.  (45) Date of Patent: Sep. 1, 2015

(54) SMART ALARM (71) Applicant: SAMSUNG ELECTRONICS CO., LTD., Suwon, Gyeonggi-Do (KR)

(72) Inventors: Curtis Sasaki, Sunnyvale, CA (US); Kuldip S. Pabla, San Jose, CA (US); Andreas Hofmann, San Jose, CA (US); Daniel Gross, Menlo Park, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 13/830,711

(22) Filed: Mar. 14, 2013

(65) Prior Publication Data

US 2013/0252591 A1  Sep. 26, 2013

Related U.S. Application Data (60) Provisional application No. 61/613,394, filed on Mar. 20, 2012.

(51) Int. Cl.
*H04M 3/42* (2006.01)
*H04W 4/00* (2009.01)
*H04M 1/725* (2006.01)
*H04W 4/02* (2009.01)

(52) U.S. Cl.
CPC ............ *H04W 4/00* (2013.01); *H04M 1/72566* (2013.01); *H04W 4/001* (2013.01); *H04W 4/02* (2013.01); *H04W 4/028* (2013.01)

(58) Field of Classification Search
CPC ......... H04W 8/18; H04W 8/183; H04W 8/12; H04W 8/16; H04W 4/00; H04L 29/08108
USPC ............ 455/414.1, 414.2, 414.3, 456.5, 418, 455/419, 432.3
See application file for complete search history.

(56) References Cited

U.S. PATENT DOCUMENTS

| | | | |
|---|---|---|---|
| 7,398,061 B2 * | 7/2008 | Mousseau | 455/90.2 |
| 7,506,035 B1 * | 3/2009 | Lu | 709/219 |
| 2007/0060205 A1 * | 3/2007 | Kim | 455/566 |
| 2009/0055235 A1 | 2/2009 | Oral et al. | |
| 2009/0216569 A1 * | 8/2009 | Bonev et al. | 705/5 |
| 2009/0278668 A1 | 11/2009 | Choi et al. | 340/309.16 |
| 2009/0325556 A1 * | 12/2009 | Lee et al. | 455/414.2 |
| 2010/0169153 A1 * | 7/2010 | Hwacinski et al. | 705/10 |
| 2010/0331016 A1 * | 12/2010 | Dutton et al. | 455/456.3 |
| 2013/0073329 A1 | 3/2013 | Shoham et al. | |
| 2013/0218971 A1 | 8/2013 | Sasaki et al. | |
| 2014/0003797 A1 | 1/2014 | Oliver | |
| 2014/0325562 A1 | 10/2014 | Beattie et al. | |

OTHER PUBLICATIONS

U.S. Non-Final Office Action for U.S. Appl. No. 13/764,469 mailed Dec. 9, 2014.
U.S. Final Office Action for U.S. Appl. No. 13/764,469 mailed May 21, 2015.

* cited by examiner

*Primary Examiner* — Khai M Nguyen
(74) *Attorney, Agent, or Firm* — Sherman IP LLP; Kenneth L. Sherman; Steven Laut (57) ABSTRACT Providing personalized content comprises discovering personal information using an electronic device. Services information related to the personal information is obtained using the electronic device. Personalized content is provided based on applying the services information to the personal information.

30 Claims, 10 Drawing Sheets

SMART ALARM

CROSS-REFERENCE TO RELATED APPLICATION

This application claims the priority benefit of U.S. Provisional Patent Application Ser. No. 61/613,394, filed on Mar. 20, 2012, incorporated herein by reference.

TECHNICAL FIELD

One or more embodiments generally relate to event updates and, in particular, to updates that impact events in mobile communication devices.

BACKGROUND

With the rapid proliferation of mobile communication devices such as smartphones amongst users such as teenagers and children, there is an increase in applications, such as calendars for appointment and event reminders via such devices.

SUMMARY

One or more embodiments generally relate to providing personalized content. One embodiment comprises discovering personal information using an electronic device. Services information related to the personal information is obtained using the electronic device. Personalized content is provided based on applying the services information to the personal information.

One embodiment comprises an electronic device including an alarm manager module discovering personal information using an electronic device. A communication module obtains services information related to the personal information using the electronic device. A first graphical user interface provides personalized content based on the services information.

Another embodiment comprises a server including a smart engine module that obtains personal information from an electronic device. A services content module obtains services information based on the personal information. A communication module transmits the services information to the electronic device for updating calendar information.

Another embodiment comprises a graphical user interface (GUI) displayed on a display of an electronic device. The electronic device comprising an alarm display including suggestions related to services information. A scheduled event display includes update indications based on the services information and information showing impacts to the scheduled event.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to providing personalized content and in particular, to using updates that impact events for providing personalized content on electronic devices, such as mobile communication devices. In one embodiment, providing personalized content comprises discovering personal information using an electronic device. In one embodiment, services information related to the personal information is obtained using the electronic device. In one embodiment, personalized content is provided based on applying the services information to the personal information. In one embodiment, notification via the electronic device includes communication, transmission, reception, origination, and updating of content via the electronic device, as described in more detail hereinbelow.

One or more embodiments provide a real-time system to obtain services information, identify events that have an impact on other events (i.e., how one event may alter surrounding events, which may occur on a user's electronic device (e.g., via a client) or remotely (e.g., on a cloud or server), and to notify the electronic device and provide personalized content. One or more embodiments provide a real-time system to resolve dependencies of events and store the dependencies. One or more embodiments provide a real-time system for aggregating event related information, check for any changes, and notify an electronic device with personalized content.

In one embodiment, the system is not internet-based and does not require server validation (such as SMSC/MMSC or sending out the content to a server located in the network). The system is suitable for a mobile device environment wherein at least a portion of content validation is performed on the device itself in real time.

One embodiment provides an end-to-end proactive process for detecting updates related to events, obtains services information, provides personalized content, and provides notification of the related updates that impact events. One embodiment provides a smart alarm system that learns a user's behavior utilizing information from the user's calendar information, current location, time of day, traffic conditions, weather conditions, etc., and suggests information, such as the time a person should leave for an appointment at a different location from their current location. Rather than a user opening up many separate applications or browser pages, the one or more embodiments learn the user's preferences and automatically bring together the relevant service information. The embodiments assist users in making informed decisions about their day, enhances user experience by providing a user with richer information to plan the rest of their day, and enhances user experience by accounting for user behavior and/or history of usage of various electronic device or application features.

One or more embodiments provide a real-time, end-to-end, device-integrated protocol and system for mobile communication devices such as wireless mobile communication devices (e.g., smartphones and tablets) to proactively enhance user experience by notifying an electronic device when there is an unexpected change in an event (e.g., an appointment, a flight, etc.) due to one or more related events. In one implementation, the embodiments take out guessing impacts of any related events, and automatically updates applications, such as user calendars, alarms, etc., keeping the application updated for events and providing personalized content related to the events. One or more embodiments provide enhancing user experience by accounting for user behavior or history of usage of various electronic device and application features. In one implementation, if a condition, based on worsening traffic conditions, occurs, the implementation will automatically notify the user of the impact to the user's next event.

Figure 1:
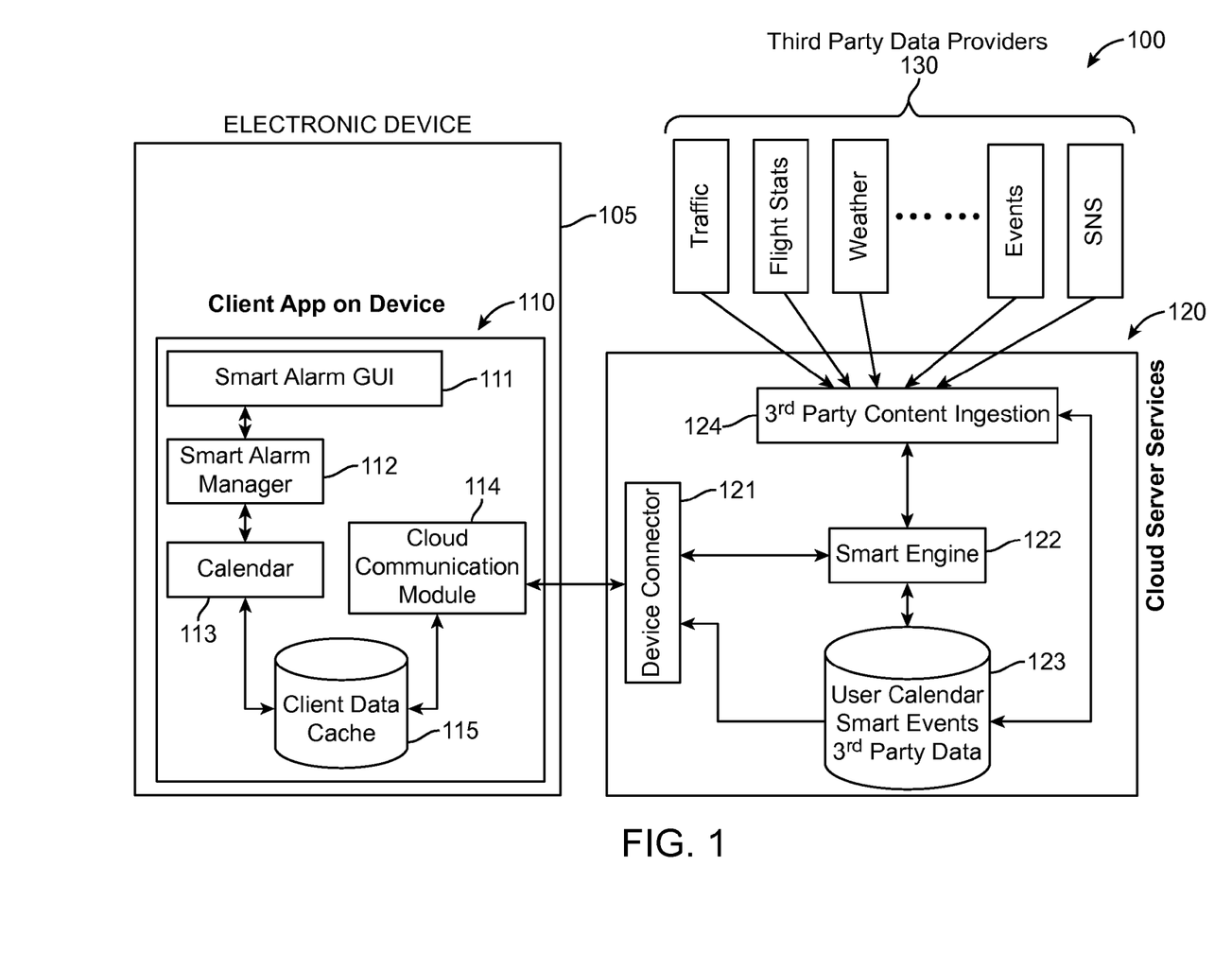
FIG. 1 shows a block diagram of an architecture for providing services information on an electronic device, according to an embodiment.

FIG. 1 shows a block diagram of architecture 100 including a client application 110 for an electronic device 105 and a cloud server 120 including a smart engine 122 for aggregating services updates and determining relevant updates that have an effect on an event on the electronic device 105 (e.g., a mobile device, such as a smart phone, cell phone, tablet, pad device, etc.) to assist users planning for their day according to one embodiment. In one embodiment, information from event updates may be used for alerting a user through a smart alarm graphical user interface (GUI) display of client application 110 and/or via sound/vibration that may be pushed to the electronic device 105 or pulled from the cloud server 120. In one embodiment, event aggregation of smaller events that affect a larger event (e.g., a calendar appointment, scheduled event, scheduled flight, etc.) are aggregated and used for determining whether the larger events will be affected so that a smart alert may be generated on, or provided to, the electronic device 105. In one embodiment, other larger events that affect other larger events are used for determining a smart alert or suggestion that may be generated on, or provided to, the electronic device 105. In one embodiment, sudden changes that affect a larger event, such as an email/text message notification of an appointment change, a user input change to a calendar/appointment event may be processed by a smart alarm manager 112 on the electronic device 105, while changes obtained from services 130 that affect a larger event may be processed by the smart engine 122 on the cloud server 120.

In one embodiment, the smart engine 122 obtains information from services 130, such as flight status (e.g., delay) information, weather information, traffic information, other event information (e.g., wait times: at restaurants, movie theatres, airport terminals, parking facilities, etc.), social networking service (SNS) information, etc., through an accumulator 124 and stores the information in a repository 123. In one embodiment, the smart engine 122 uses the obtained information from the services 130 and determines whether the obtained information has an effect on a larger event based on information from a user's calendar, smart event information, third party data, etc. that is stored in the repository 123. For example, traffic delay information from services 130 may be used to determine that a next scheduled appointment communicated from a calendar 113 through a cloud communication module 114 to a device connector 121 may be found to be in jeopardy by the smart engine 122 based on determining a current location of the electronic device 105 and average travel time determined from the traffic information and based on a user's travel history (if any) that may be maintained in a client data cache 115. In one embodiment, information, such as previous known travel times, known distance and current traffic speed, road conditions due to repair, etc. may be used to determine the amount of time that it is estimated to take to arrive at a different location for a larger event (e.g., a meeting, scheduled event (e.g., a movie, a flight, a bus, a train, etc.), desired location, etc.). Additionally, bad weather information resulting may be obtained from services 130 that results in a delay condition (e.g., snow, hail, visibility, rain, etc.) may also add to additional delay time that may affect the scheduled time for a larger event.

In another implementation, the services information 130 is analyzed by the smart engine 122 to determine if the information from different services will affect a larger event in order to communicate the information to the smart alarm manager 112 on the electronic device 105. In one embodiment, the services information 130 may be obtained based on location. For example, if a scheduled meeting is located at an office after a scheduled flight, then current location information can be used for obtaining services information 130 for local traffic, weather and flight information. Upon arrival at the destination airport, the new local information for weather, traffic, etc. is obtained to determine whether any update from the smart alarm manager 112 should generate information on the smart alarm GUI 111. In one implementation, based on the known estimated arrival time and the destination local traffic and weather information, the smart engine 122 determines whether a user will be on time for a scheduled event (e.g., meeting, reservations, appointment, etc.) based on the services information 130 and historical information collected over time (e.g., driving habits, estimated driving times, etc.). If the smart engine 122 determines that the combined information will affect getting to the scheduled event on time, an alert or alarm may be triggered on the smart alarm GUI 111 informing a user that they have to leave: now, within a period of time (e.g., 5 minutes, 10 minutes, etc.) in order to make the scheduled event, appointment, etc. With the enhancements of the various implementations and embodiments, a user may not need to set alarms as the embodiments will learn to automatically alert the user based on learning and tracking habits and travel information.

In one embodiment, the alert communicated on the smart alarm GUI 111 may suggest actions for a user to take, such as send an email or text message to appointment participants (which may occur on the electronic device 105, on the cloud server 120, or a combination of the electronic device 105 and the cloud server 120), schedule a new event, leave early for a destination, prepare for delays, etc. In one embodiment, the smart engine 122 tracks user behavior and usage history of one or more features of the electronic device 105 and adjusts and updates applications, such as an alarm or calendar application, based on the tracked user behavior and usage history of the one or more features. In one implementation, the usage features may include global positioning system (GPS) information, travel times, routes, traffic time/date based history, etc. In one example, based on tracked history of user travel habits, the smart engine 122 may generate an alert on the smart alarm GUI 111 informing the user whether they are late, on time, need to leave earlier, etc.

In one embodiment, the smart engine 122 and/or the smart alarm manager 112 combine to create an alert (e.g., text, video, sound, speech, vibration, etc.) on the electronic device 105 upon an unexpected change to the scheduling for an event based on a related event (e.g., smaller event). In one implementation, the smart engine 122 validates the updates of services information 130 related to the larger event in real time (or near real-time) by analyzing the updates, and filtering the updates based on whether they effect the larger event or not. In one implementation, user behavior that is tracked and usage history of one or more features of the electronic device 105 is used by the smart engine 122 to adjust updates of applications (e.g., calendars, appointments, reservations, scheduled flights, etc.) based on the tracked user behavior and usage history of the one or more features.

Figure 2:
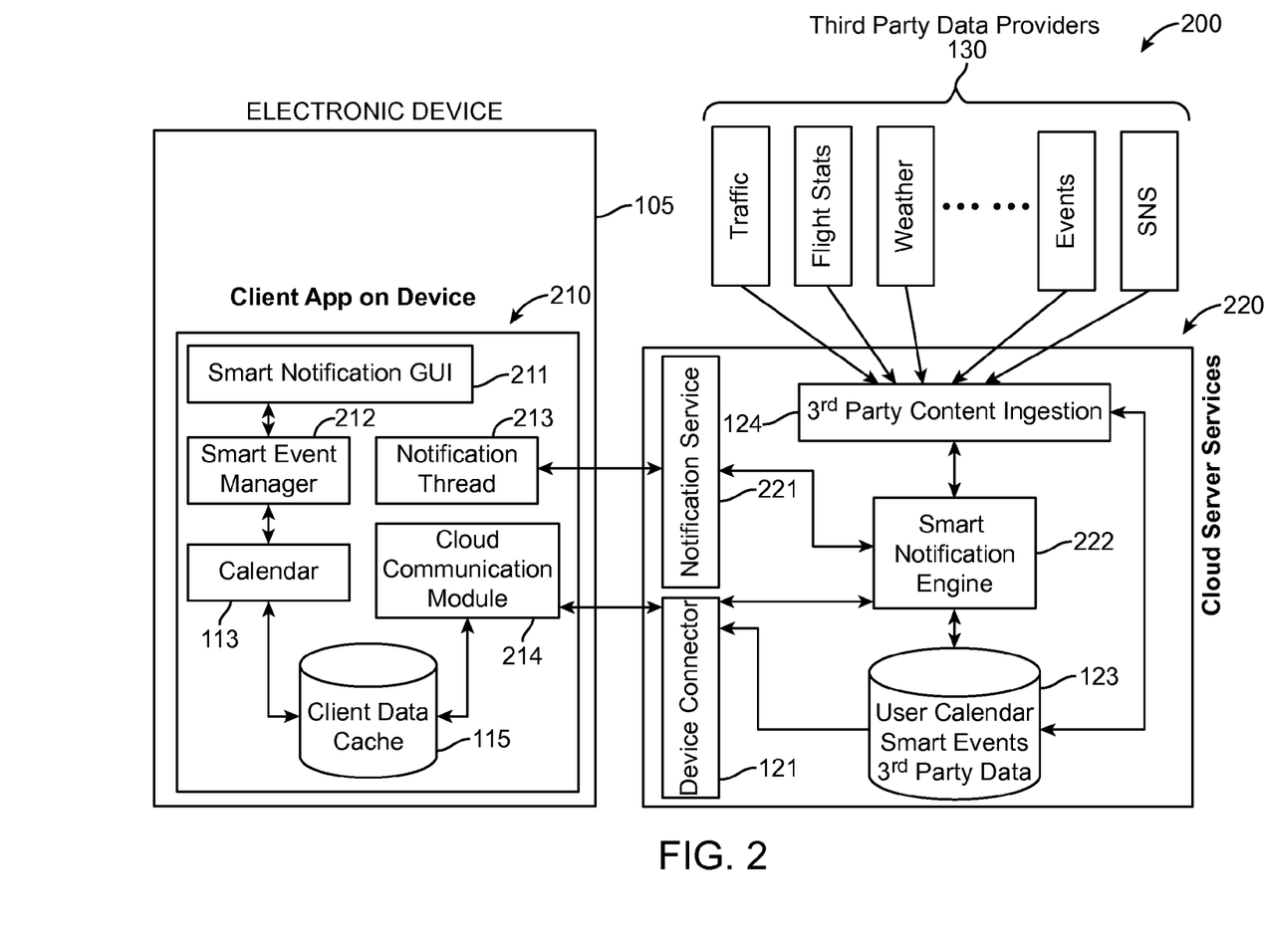
FIG. 2 shows a block diagram of an architecture for providing notifications on an electronic device, according to an embodiment.

FIG. 2 shows a block diagram of architecture 200 including a client application 210 for the electronic device 105 and a cloud server 220 including a smart notification engine 222 for aggregating services updates and determining relevant notifications to display on a smart notification GUI 211 on the electronic device 105 to assist users planning for their day, according to one embodiment. In one embodiment, the electronic device 105 includes both the client application 110 and the client application 210. In one embodiment, the cloud server 120 and the cloud server 220 are combined together.

In one embodiment, information from services information 130 may be used for notifying a user through a smart notification GUI 211 of client application 210 that may be pushed to the electronic device 105 or pulled from the cloud server 220. In one embodiment, information gathered from the smart notification engine 222 may be used by the notification thread 213 and smart event manager 212 to notify a user via the smart notification GUI 211 with information that is pertinent to the user's daily events and schedules. In one implementation, weather information obtained by the smart notification engine 222 may be used to inform a user of how to prepare for the weather. In one example, clothing suggestions, accessory suggestions, etc. may be made through the smart notification GUI 211 based on weather information obtained by the smart notification engine 222 (e.g., "Rain is expected so bring your umbrella," "It will be cold today so dress warm," etc.). In another implementation, event information may be obtained from emails, chat conversations, and text messages regarding an event via the notification thread 213 and cloud communication module 214. The event information obtained may be communicated to the smart notification engine 222 through the notification service 221 and the device connector 121 and used to determine appropriate notifications, such as a reminder to dress appropriately (e.g., wear business casual attire for a specific meeting discussed in an email, chat or text message).

In one embodiment, other notifications, such as a summary of daily events may be displayed on the smart notification GUI 211, such as appointments, planned events, etc. In one example, based on a user's location, weather condition, traffic condition, etc., a notification of a best time to leave for a next scheduled appointment or event may be displayed, along with other appropriate information (e.g., traffic is getting worse, weather is getting worse/better, etc.). In one embodiment, appropriate notifications are generated by the smart event manager 212 based on the location of an appointment or scheduled event, such as weather at the event location (which may be different from the current location). In another embodiment, services information 130 may include information based on a venue or point of interest (POI), such as a restaurant, theme park, stadium, movie theatre, etc. In one example, information regarding a specific daily dish may be obtained based on dinner reservations and then be displayed on the smart notification GUI 211. Information regarding wait times at a theatre may be used to determine when a user should leave for a scheduled movie, or whether a movie is sold out in order to suggest another theatre or movie. In one example, a daily promotion (e.g., deal of the day, limited sale, special guest, etc.) based on location, time, etc. of an event or location of a user may be sent to the user or to participants of an event and displayed on the smart notification GUI 211 or a display of electronic devices of participants.

In one embodiment, sudden changes that effect a larger event, such as an email/text message notification of an appointment change, a user input change to a calendar/appointment event may be processed by the smart event manager 212 on the electronic device 105, while changes obtained from services 130 that affect a larger event may be processed by the smart notification engine 222 on the cloud server 220.

In one embodiment, the smart notification engine 122 obtains information from services 130, such as flight status (e.g., delay) information, weather information, traffic information, other event information (e.g., wait times: at restaurants, movie theatres, airport terminals, parking facilities, etc.), social networking service (SNS) information, etc., through an accumulator 124 and stores the information in a repository 123. In one embodiment, the smart notification engine 222 uses the obtained information from the services 130 and determines whether the obtained information has an effect on a larger event based on information from a user's calendar, smart event information, third party data, etc. that is stored in the repository 123. For example, traffic delay information from services 130 may be used to determine that a next scheduled appointment communicated from a calendar 113 through a cloud communication module 214 to a device connector 121 may be found to be in jeopardy by the smart notification engine 222 based on determining a current location of the electronic device 105 and an average travel time determined from the traffic information and based on a user's travel history (if any) that may be maintained in a client data cache 115. In one embodiment, information, such as previous known travel times, known distance and current traffic speed, road conditions due to repair, etc. may be used to determine the amount of time that it is estimated to take to arrive at a different location for a larger event (e.g., a meeting, scheduled event (e.g., a movie, a flight, a bus, a train, etc.), desired location, etc.). Additionally, bad weather information may be obtained from services 130 that results in a delay condition (e.g., snow, hail, visibility, rain, etc.) may also add to additional delay time that may affect a scheduled time for a larger event.

In another implementation, the services information 130 are analyzed by the smart notification engine 222 to determine if the information from different services will affect a larger event in order to communicate a notification through the notification service 221 to the notification thread 213 so that the smart event manager 212 on the electronic device 105 may generate a notification on the smart notification GUI 211. In one embodiment, the services information 130 may be obtained based on location. For example, if a planned event is located at a shopping mall after a scheduled automobile drive, then current location information can be used for obtaining services information 130 for local traffic and weather, and past travel history and driving habits may be used for determining whether a user should leave now, will be on time, should make a communication with an update, etc. Upon arrival at the destination, the new local information for weather, traffic, etc. is obtained to determine whether any further update notification is required from the smart event manager 212. With the enhancements of the various implementations and embodiments, a user may not need to manually obtain relevant information as the embodiments will learn to automatically notify the user based on learning and tracking habits and travel information.

In one embodiment, the notification communicated on the smart notification GUI 211 may leverage other electronic device 105 features, such as prepare an email or text message to appointment participants (which may occur on the electronic device 105, on the cloud server 120, or a combination of the electronic device 105 and the cloud server 120), reschedule an event, update appointment information, etc. In one embodiment, the email or text message may be manually prepared by a user of the electronic device 105, automatically prepared by the electronic device 106, automatically prepared by the cloud server 120, or automatically prepared by a combination of the electronic device and the cloud server 120.

In one embodiment, the smart notification engine 222 tracks user behavior and usage history of one or more features of the electronic device 105, and adjusts and updates applications, such as an alarm or calendar application, based on the tracked user behavior and usage history of the one or more features. In one implementation, the usage features may include GPS information, travel times, routes, traffic time/date based history, appointment history, etc. In one example, based on tracked history of user travel habits, the smart notification engine 222 may generate a notification on the smart notification GUI 211 to alter travel plans, provide maps with new routes, provide restaurant suggestions based on location, etc. For example, if a user is delayed for an event for any reason, the smart notification engine 222 may send a text message or email message to event participants informing them that one or more of the participants is running late (i.e., delaying the event) so that the other participants may plan/schedule/prepare, etc. accordingly.

Figure 3:
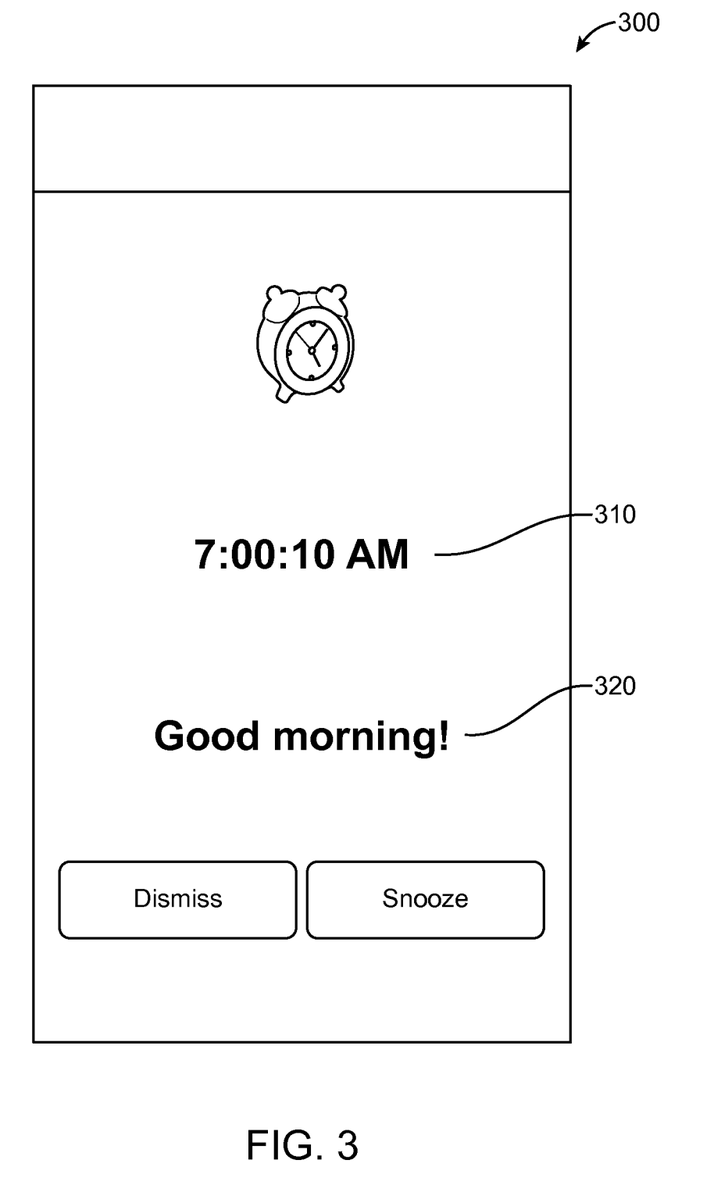
FIG. 3 shows an example alarm graphical user interface (GUI) for providing personalized content on an electronic device, according to an embodiment.

FIG. 3 shows an alarm GUI 300 showing a basic alarm including time 310, a simple notification 320. In one embodiment, the alarm GUI 300 may include smart alarm information in the notification 320, such as "please wake up now" based on obtaining services information 130. In one example, the services information 130 may include information of heavy traffic on a route to a user's appointment or workplace that could cause a thirty (30) minute delay based on the user's typical route and historical driving habits, starting time, etc. Based on the aggregated information, a user may be late for the appointment or work if they woke up at the pre-set alarm time of 7:00 AM. In one implementation, the smart alarm manager 112 using the smart engine 122 would automatically adjust the wake-up time (e.g., to 6:30 AM) in order to compensate for the determined delays. In another implementation, the smart event manager 212 with the smart notification engine 222 could generate a notification on the alarm GUI 300 to inform the user as to the reason why they should wake up earlier. In another embodiment, if the user determines not to wake-up earlier, the obtained information may be used to change the calendar or appointment information or notify known participants that the user may be late.

Figure 4:
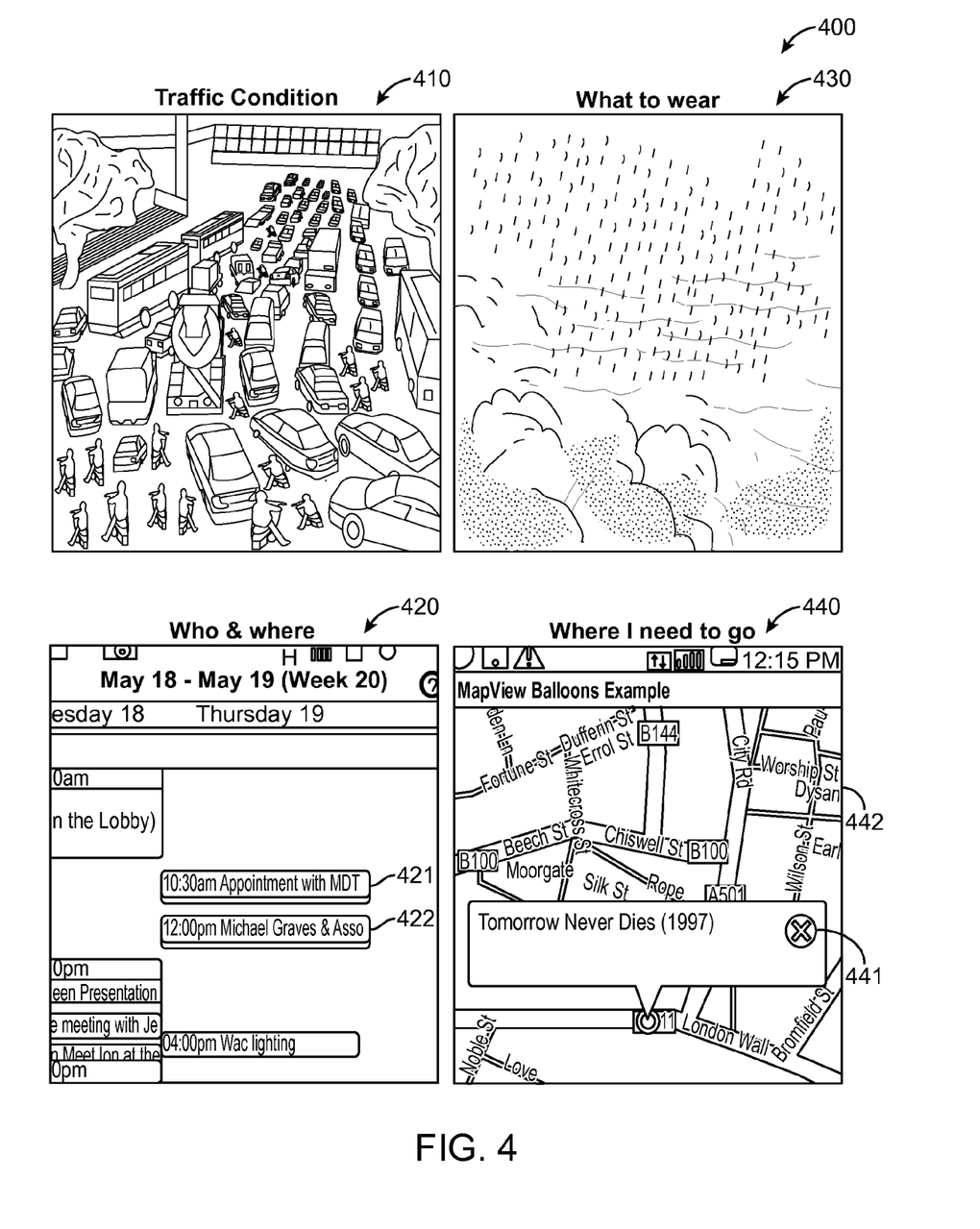
FIG. 4 shows event information used for providing personalized content on an electronic device, according to an embodiment.

FIG. 4 shows event information 400 used for providing personalized content on an electronic device, according to an embodiment. In one implementation, the event information 400 may include traffic conditions 410, which may include congestion, alternate routes, construction delays, police events, etc. The event information 400 may also include information related to calendars 420, such as time, place, participants, date(s), appointments (e.g., appointment 421, appointment 422), etc. In one implementation, a query 430 of "what to wear" for a particular date may result in using services information 130 for obtaining a weather forecast of a starting point and end point for an appointment or event. In one implementation, the electronic device 105 may automatically show a map 440 including a current location 441 and route(s) 442, where an original route and alternate route may visually be seen, along with POI information and event information. In one embodiment, the map 440 may be updated with information obtained by services information 130 for suggesting alternate POIs based on obtained information. In one example, if a wait time for a restaurant is 30 minutes, and another event would be delayed, an alternate restaurant with a shorter wait time (or no wait time) may be suggested on the map 440 or other GUI.

Figure 5:
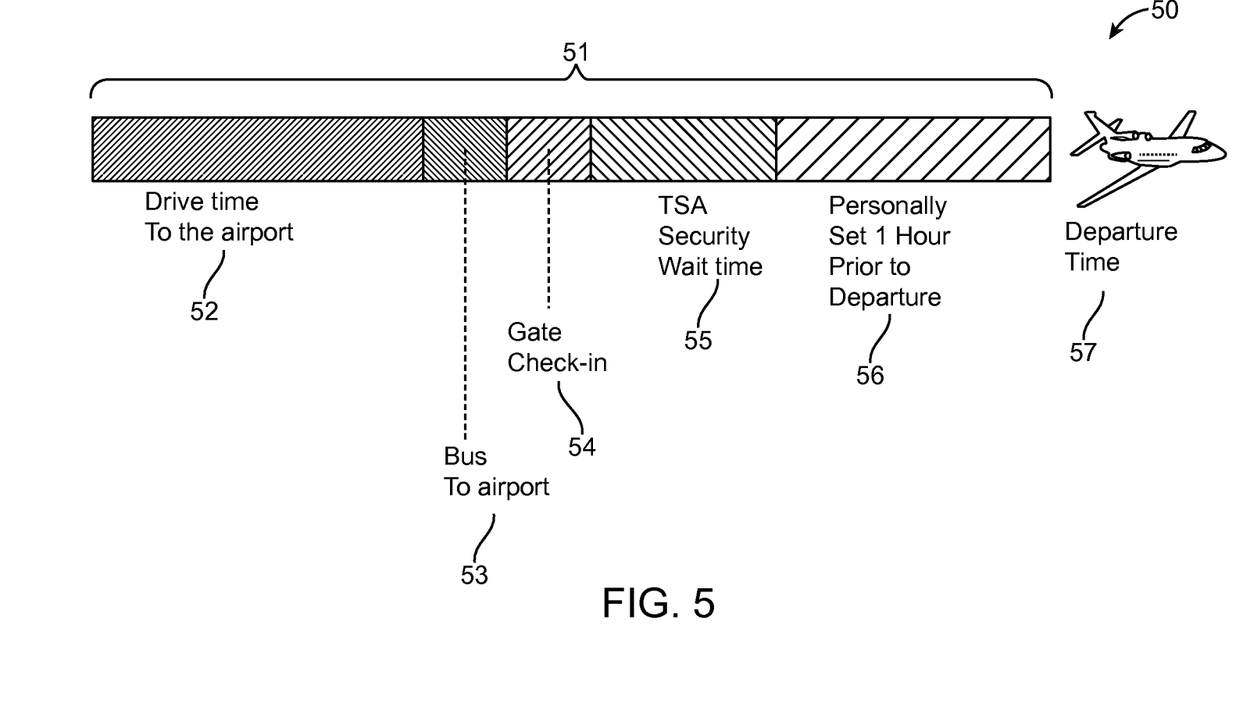
FIG. 5 shows an example of event segmentation used for providing personalized content on an electronic device, according to an embodiment.

FIG. 5 shows an example of an event segmentation 51 for an event 50 used for providing personalized content on an electronic device 105, according to an embodiment. In one example, the event 50 relates to a flight departure 57 schedule that is entered in a user's calendar or appointment application on the electronic device 105. Based on services information 130 obtained by the smart engine 122 and the smart notification engine 222, the event 50 is segmented in multiple timing segments, such as drive time to the airport 52, bus to terminal at the airport 53, gate check-in 54, TSA security wait time 55, and time selected by a user of one hour prior to departure 56. In one embodiment, the event segmentation 51 is used to obtain relevant timing information on each of the segments in order to update and notify the user of the electronic device 105 of any problems or delays that may effect them meeting the scheduled flight departure 57.

Figure 6:
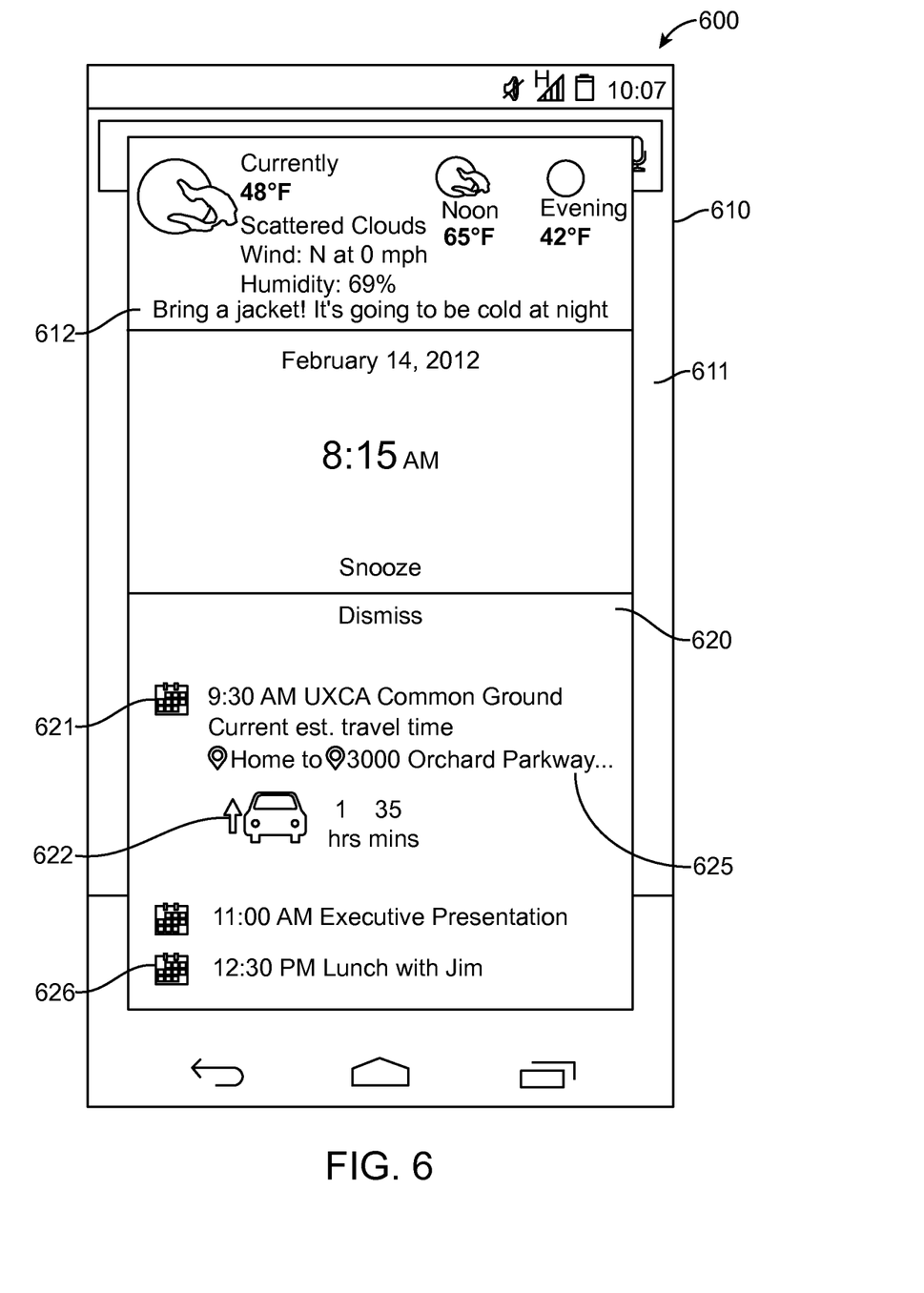
FIG. 6 shows another example GUI for providing personalized content on an electronic device, according to an embodiment.

FIG. 6 shows another example GUI 600 for providing personalized content on an electronic device, such as electronic device 105, according to an embodiment. In one implementation, the GUI 600 includes multiple customizable sections, such as a weather section 610, a smart alarm GUI section 611, a weather-based notification section 612, and a calendar or scheduled event section 620. In one example, the weather based notification section 612 includes personalized content of "Bring a jacket! It's going to be cold at night" which is based on the services information 130 related to weather information. In one implementation, based on the scheduled events and the weather information obtained, the weather-based notification section 612 provides a suggestion that is appropriate for the time of day, place, event, etc. In one embodiment, a text-to-speech process may be implemented on the electronic device 105 such that suggestions, personalized content, summary of daily events, summary of suggestions, personalized content, summary, etc. may be converted to speech and output from the electronic device 105 for a user to listen (instead of read on the GUI 600).

In one example, the smart alarm GUI section 611 is automatically set based on the scheduled appointments shown in the event section 620 and the related information obtained from services 130, such as traffic, weather, user habits, driving history, etc. In one example, the event section 620 shows multiple events, such as a first event 621 and a second event 626. In one embodiment, the current scheduled event 621 is shown with a GUI 625 notification of starting point and end point, and the current estimated travel time that is updated based on obtained services 130 information and any sudden changes, such as stopping along the way, a participant that is going to be late, etc. In one embodiment, information 622 may be displayed showing the user whether traffic is getting worse or better. In one example, an arrow, color, message notification, etc. may be used to show a user whether the traffic is improving or not.

Figure 7:
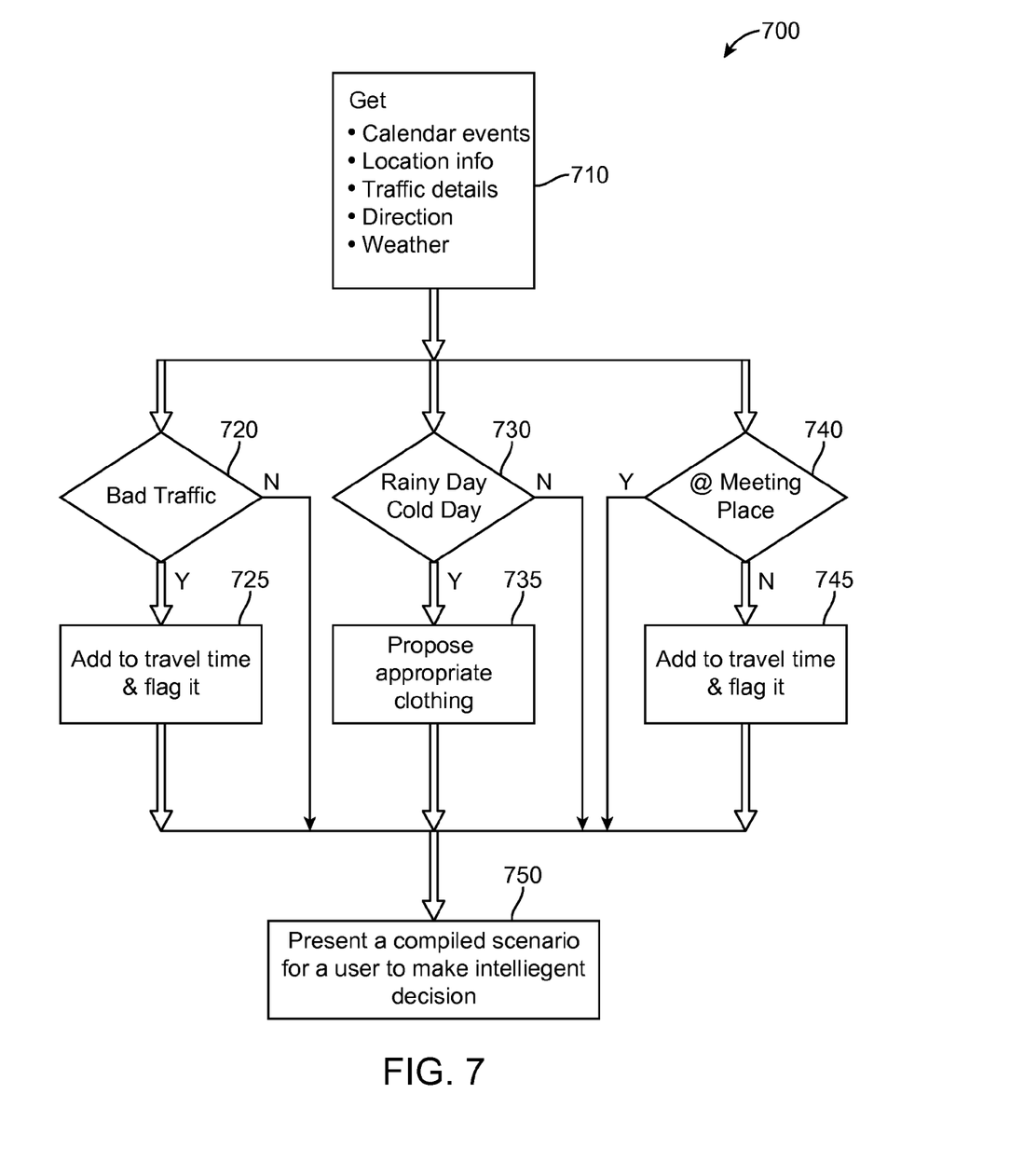
FIG. 7 shows a flowchart of event processing for an electronic device for providing personalized content on the electronic device, according to an embodiment.

FIG. 7 shows a flowchart of an event processing process 700 for an electronic device 105 for providing personalized content on the electronic device 105, according to an embodiment. In one embodiment, information is obtained in process block 710, such as calendar events, location information, traffic details, direction of travel, weather, etc. In one embodiment, if bad traffic conditions (e.g., delays) are determined in process block 720, the process continues to process block 725 where determined traffic delays are added to travel time and the information is flagged in order to update scheduled event information. In process block 730, it is determined if the weather forecast will require any notifications, such as if it is going to rain, be cold, snow, etc. If it is determined that a notification is required, then the process continues to process block 735 where a notification is sent to the electronic device 135, such as providing a suggestion to wear appropriate clothing.

In one embodiment, process block 740 determines the time it is estimated to travel to an event or meeting place has changed based on other events or user tracked history information (e.g., driving habits, routes, etc.). If it is determined that additional travel time is required, process block 745 adds the additional travel time and flags the event in order to update scheduled event information. The process 700 continues to flow to block 750 after processing blocks 725, 735 and 745 are completed or not required. In process block 750, the obtained information is compiled into a scenario and presented to a user on a GUI of the electronic device 105.

Figure 8:
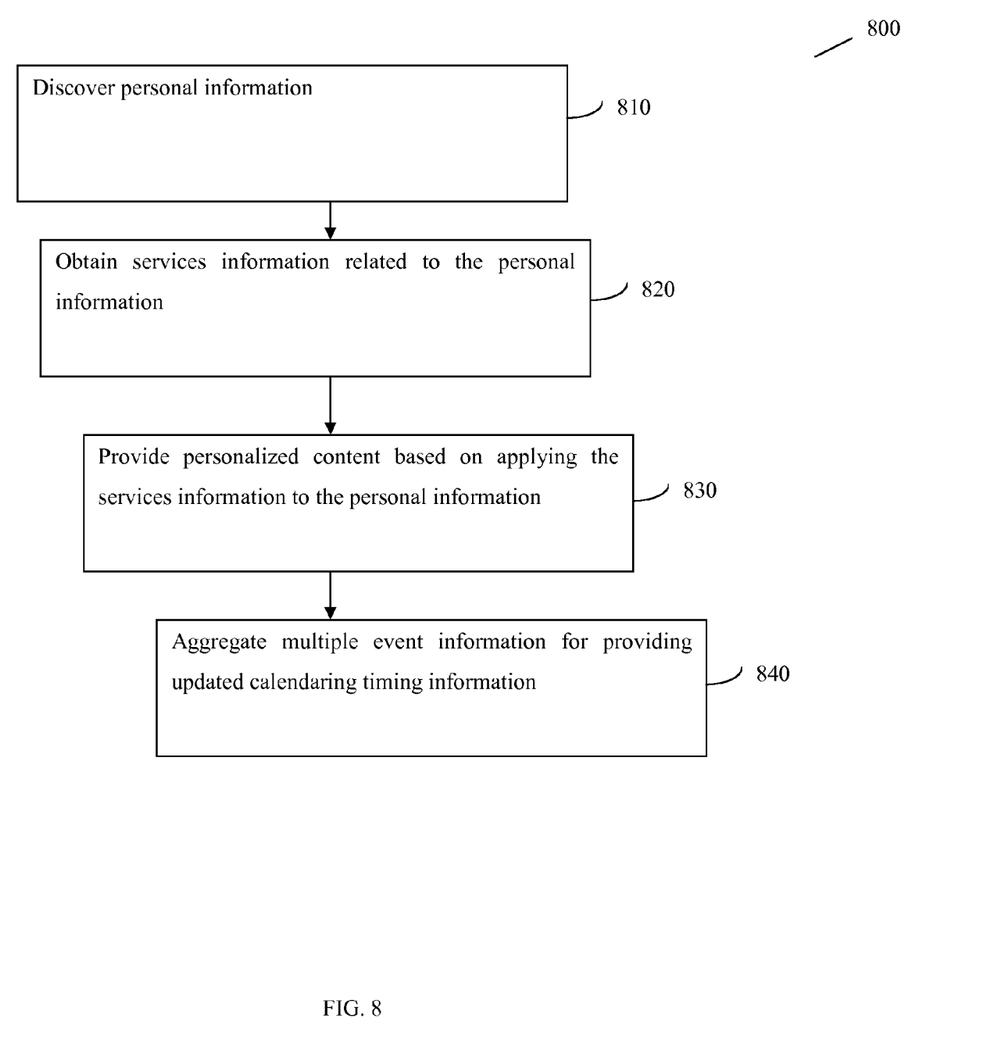
FIG. 8 shows a flowchart of an event update process for providing personalized content on an electronic device, according to an embodiment.

FIG. 8 shows a flowchart of an event update process 800 for providing personalized content on an electronic device, according to an embodiment. The electronic device (e.g., electronic device 105) includes applications for events, such as applications for calendaring, appointments, reservations, scheduled transportation (e.g., flights, trains, busses, ships/boats), smart alarm, smart notifications, etc. The mobile device also includes features, such as GPS, mapping, Internet capability, etc. The event update process 800 is integrated with the mobile device functions (i.e., location information, mapping, Internet functionality, etc.) for analyzing event update information and filtering out non-relevant update information.

In process block 810, personal information is discovered, such as appointments, alarm settings, travel history, location, etc. Process block 820 comprises aggregating services information related to the personal information from one or more information sources (e.g., traffic information sources, weather information sources, transportation information sources, etc.). The one or more information sources comprise information for one or more real-time conditions that alter or have an effect on the personal information, such as appointments, schedules, etc. Process block 830 comprises aggregating multiple event information for providing updated calendaring timing information. For example, unexpected changes in events based on the obtained services information. For example, an unexpected change may be a traffic delay caused by an accident, weather delays, flight delays, where the unexpected changes may be either local or destination based (e.g., location of flight destination). Information is obtained from the mobile device for determining an effect of the related updates on event. In one embodiment, the impacts may be negative (e.g., delay of a scheduled event) or positive (an event that results in addition of time or time savings). In one embodiment, the updates related to the event are validated in real time (or near real-time) in the mobile device by analyzing the updates, and filtering the updates on the mobile device. In one implementation, process block 840 provides for the event update process to automatically update applications, such as calendars, on one or more mobile devices based on the aggregated related updates that impact the event. In one embodiment, the event update process 800 tracks user behavior and usage history of one or more features of the mobile device, and adjusts updates of event applications, such as calendars, based on the tracked user behavior and usage history of the one or more features.

Figure 9:
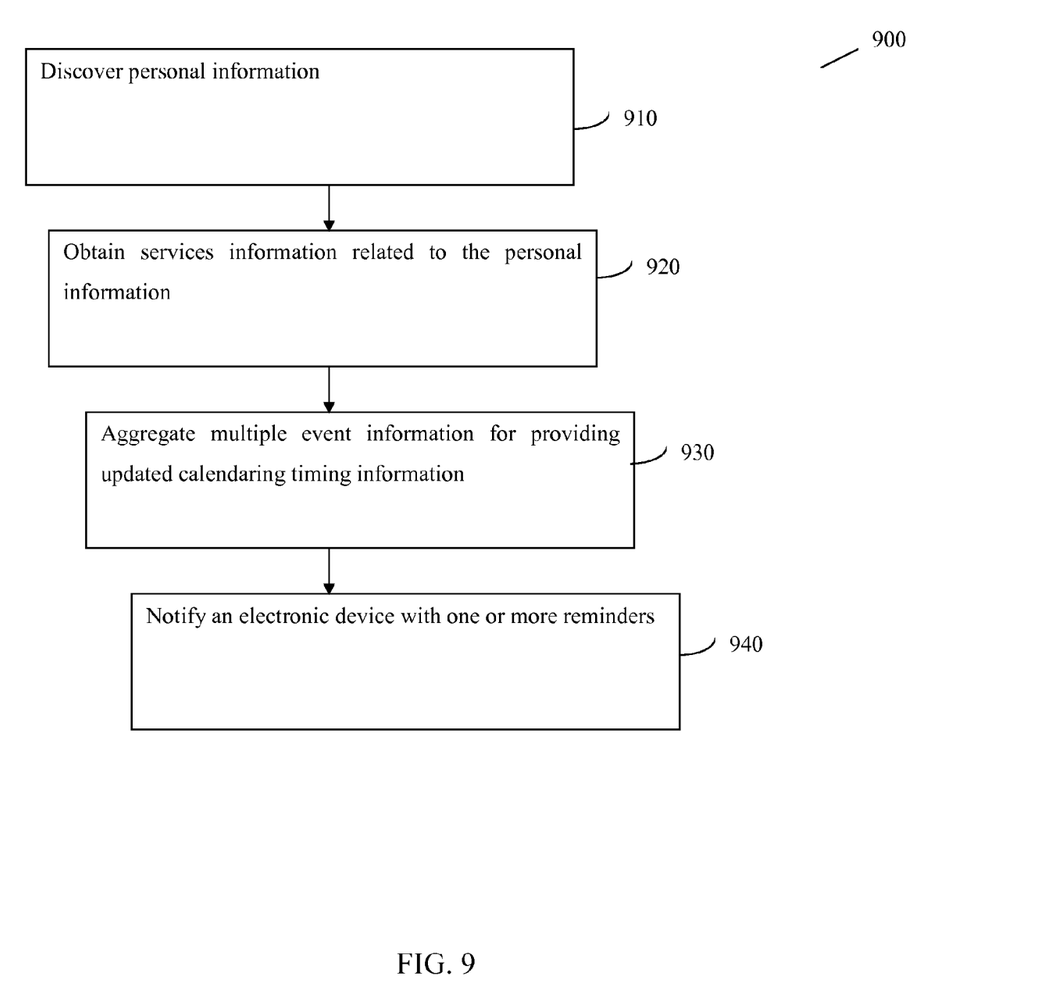
FIG. 9 shows a flowchart of an event update process for notifying an electronic device, according to an embodiment.

FIG. 9 shows a flowchart of an event update process 900 for notifying an electronic device, according to an embodiment. The electronic device (e.g., electronic device 105) includes applications for events, such as applications for calendaring, appointments, reservations, scheduled transportation (e.g., flights, trains, busses, ships/boats), smart alarm, smart notifications, etc. The mobile device also includes features, such as GPS, mapping, Internet capability, etc. The event update process 900 is integrated with the mobile device functions (i.e., location information, mapping, Internet functionality, etc.) for analyzing event update information and filtering out non-relevant update information.

In process block 910, personal information is discovered, such as appointments, alarm settings, travel history, location, etc. Process block 920 comprises aggregating services information related to the personal information from one or more information sources (e.g., traffic information sources, weather information sources, transportation information sources, etc.). The one or more information sources comprise information for one or more real-time conditions that alter or have an effect on the personal information, such as appointments, schedules, etc. Process block 930 comprises aggregating multiple event information for providing updated calendaring timing information. For example, unexpected changes in events based on the obtained services information. For example, an unexpected change may be a traffic delay caused by an accident, weather delays, flight delays, where the unexpected changes may be either local or destination based (e.g., location of flight destination). Information is obtained from the mobile device for determining an effect of the related updates on event. In one embodiment, the impacts may be negative (e.g., delay of a scheduled event) or positive (an event that results in addition of time or time savings). In one embodiment, the updates related to the event are validated in real time (or near real-time) in the mobile device by analyzing the updates, and filtering the updates on the mobile device.

In one embodiment, process block 940 provides a notification to the electronic device with one or more reminders or suggestions. In one implementation, the event update process 900 automatically provides notification of reminders and suggestions, such as appointment reminders (e.g., you should leave earlier, your running late, etc.), suggestions related to weather (e.g., appropriate clothing to wear). In one embodiment, the event update process 900 tracks user behavior and usage history of one or more features of the mobile device, and adjusts notifications for event applications based on the tracked user behavior and usage history of the one or more features. In embodiment, notifications may include updated estimated travel time, information on whether traffic is getting better/worse, alternate events or routes, etc.

Figure 10:
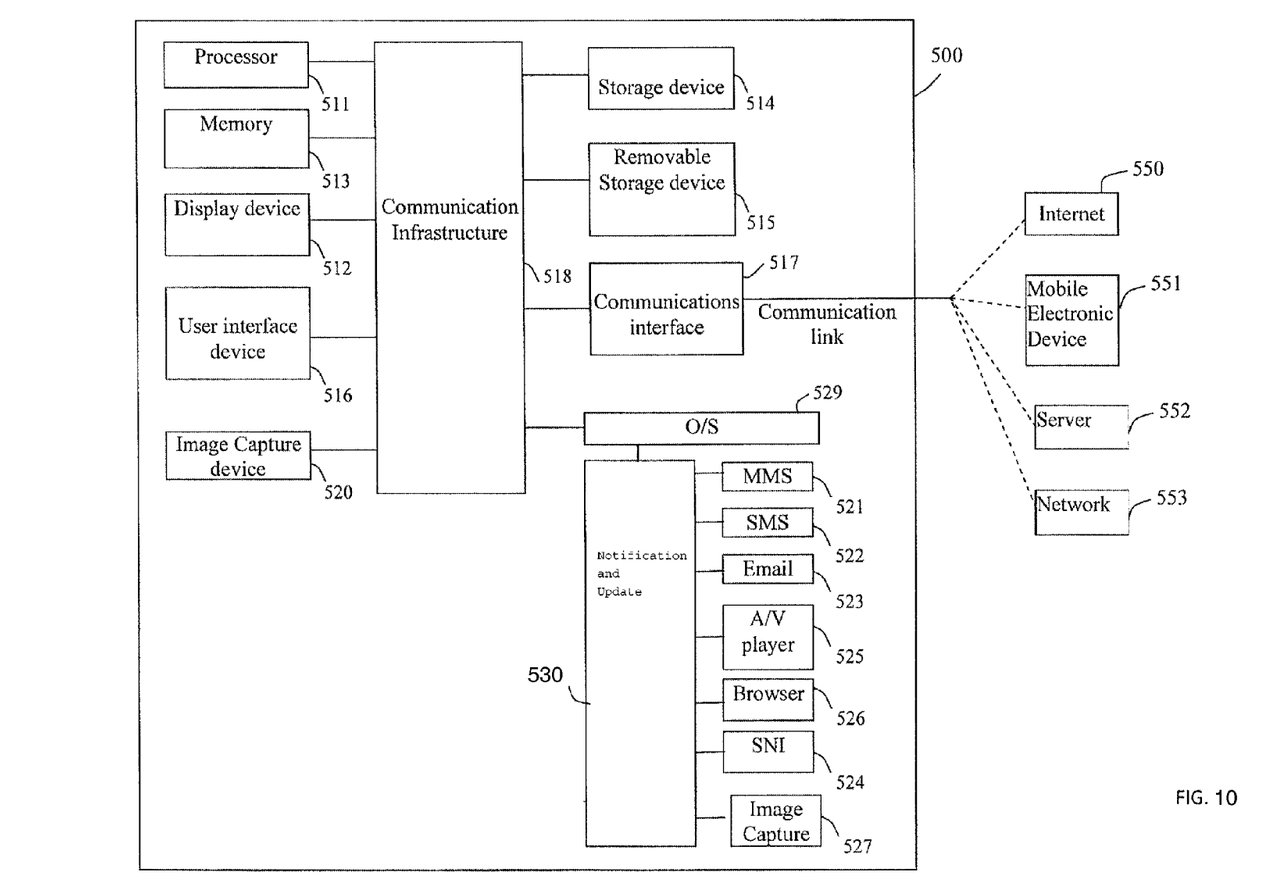
FIG. 10 is a high-level block diagram showing an event update and notification processing system comprising a computing system implementing an embodiment.

FIG. 10 is a high-level block diagram showing an information processing system comprising a computing system 500 implementing an embodiment. The system 500 includes one or more process ors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one or more embodiments, in a mobile wireless device such as a mobile phone, the system 500 further includes an image capture device such as a camera 520. The system 500 further includes application modules at which content terminates/originates such as MMS module 521, SMS module 522, e-mail module 523, social network interface (SNI) module 524, audio/video (AV) player 525, web browser 526, image capture module 527, etc.

The system 500 further includes a notification and update module 530 as described herein, according to an embodiment. The notification and update module 530 performs event update (e.g., calendar events, appointment events, reservation events, scheduled transportation events, etc.) and notification (e.g., alerts, reminders, notices, etc.) on the system 500 in real time, such as described herein in relation to FIGS. 1-2. Example implementation of the update and notification module 530 is smart engine 122 and application 110 in FIG. 1, and smart notification engine 222 and application 210 in FIG. 2.

In one implementation of said application modules, content validation modules along with an operating system 529 may be implemented as executable code residing in a memory of the system 500. In another embodiment, such modules are in firmware, etc. Preferably, the content validation modules cannot be uninstalled from the device and the user will not have any way to disable the content validation features. Hence, the content validation is embedded into the operating system or firmware of the device at various levels (e.g., libraries, framework levels, etc.). The content validation modules are integrated with said application modules to provide content validation according to one or more embodiments.

In one example, the event update and notification integration is implemented as code (e.g., utilizing API of the application modules) for obtaining update information, filtering out update information, and determining impacts to events in the application modules and providing notification of impacted events to a mobile device.

In one embodiment, the system 500 may communicate with one or more of Internet 550, mobile electronic device 551, server 552, network 553 in a wired and/or wireless manner.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments of have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for providing personalized content, comprising:
discovering personal information using an electronic device, wherein the personal information comprises updated personal planned daily event information previously entered into one or more applications executed by the electronic device;
obtaining services information related to the personal information using the electronic device; and
providing personalized content based on applying the services information to the personal information.

2. The method of claim 1, wherein the personal information further comprises historical travel information and one or more of changeable: calendar information, location information, and communication information.

3. The method of claim 2, wherein the calendar information comprises daily scheduled appointment information that comprises one or more of appointment location, event start time, event end time, and participants.

4. The method of claim 3, wherein services information is related to personal planned daily events and comprises weather information, traffic information, location information and wait time information.

5. The method of claim 4, wherein providing personalized content comprises providing one or more of clothing suggestions, accessory suggestions based on weather information, departure recommendations based on appointment schedules, traffic conditions, and historical travel information.

6. The method of claim 5, wherein providing personalized content comprises providing point of interest (POI) information based on appointment location.

7. The method of claim 6, further comprising:
updating contact information based on changed location information and appointment location information.

8. The method of claim 5, further comprising aggregating multiple event information for providing updated calendaring timing information impacted by aggregated multiple event information.

9. The method of claim 8, wherein the multiple event information comprises length of time that each of the multiple events consumes.

10. The method of claim of claim 1, further comprising:
notifying the electronic device with one or more reminders based on an updated change in travel time, wherein a reminder comprises a notification for modifying future appointment time schedule based on updated traffic information and estimated travel time.

11. The method of claim 1, further comprising:
automatically providing local maps and points of interest (POI) information based on travel plans, wherein the local maps and POI information are displayed on the electronic device.

12. The method of claim 11, further comprising:
creating a dynamic address book based on the POI information.

13. The method of claim 12, further comprising:
enabling temporary sharing of location data for locating contacts.

14. The method of claim 13, further comprising:
using favorite local POI information for applying to an appointment location for finding similar POI information in the appointment location.

15. The method of claim 14, further comprising:
analyzing communication information and appointment location for determining POI suggestions and providing the suggested POI information on a map; and
tracking user behavior for obtaining the historical travel information, wherein the historical travel information comprises one or more of travel time between locations, driving habits, and calendar appointment punctuality.

16. The method of claim 1, wherein the electronic device comprises a wireless mobile communication device.

17. An electronic device, comprising:
a processor device configured to:
discover, by an alarm manager, personal information, wherein the personal information comprises updated planned personal daily event information previously entered into one or more applications executed by the electronic device; and
obtain, by a communication interface, services information related to the personal information; and
a graphical user interface that provides personalized content via the electronic device based on the services information.

18. The electronic device of claim 17, wherein:
the personal information further comprises historical travel information and one or more of changeable: calendar information, location information, and communication information;
the calendar information comprises daily appointment information including one or more of scheduled appointment location, event start time, event end time and participants; and
the services information is related to personal planned daily events and comprises weather information, traffic information, location information and wait time information.

19. The electronic device of claim 18, wherein the personalized content comprises one or more of clothing suggestions, and accessory suggestions based on weather information, departure recommendations based on one or more of appointment schedules, traffic conditions, weather conditions and historical travel information.

20. The electronic device of claim 18, wherein the personalized content comprises point of interest (POI) information based on appointment location.

21. The electronic device of claim 17, wherein:
the alarm manager updates contact information based on changed location information and appointment location information, and aggregates multiple event information for providing updated calendaring timing information impacted by aggregated multiple event information to a calendar application of the electronic device; and
the multiple event information comprises length of time that each of the multiple events consumes.

22. The electronic device of claim 17, wherein:
the processor is further configured to provide, via a notification interface, one or more reminders based on updated change in travel time; and a reminder comprises a notification for modifying future appointment time schedule based on updated traffic information and estimated travel time.

23. The electronic device of claim 22, wherein:
the processor is further configured to automatically provide, via an event manager, local maps and points of interest (POI) information based on travel plans, creates a dynamic address book based on the POI information, enables temporary sharing of location data for locating contacts, uses favorite local POI information for applying to an appointment location for finding similar POI information in the appointment location, analyzes communication information and appointment location for determining POI suggestions and providing the suggested POI information on a map display, and tracks user behavior for obtaining the historical travel information; and
the historical travel information comprises one or more of travel time between locations, driving habits, and appointment punctuality.

24. A server comprising:
a processor device configured to:
obtain, via a smart engine, personal information from an electronic device, wherein the personal information comprises updated personal planned daily event information previously entered into one or more applications executed by the electronic device;
obtain, via a services content interface, services information based on the personal information; and
transmit, via a communication interface, the services information to the electronic device for updating calendar information.

25. The server of claim 24, wherein:
the personal information further comprises historical travel information and one or more of changeable: calendar information, location information, and communication information;
the calendar information comprises daily appointment information including one or more of scheduled appointment location, event start time, event end time and participants; and
the services information is related to personal planned daily events and comprises weather information, traffic information, location information, and wait time information.

26. The server of claim 24, wherein the processor is further configured to:
obtain, via a notification interface, personal information from the electronic device, wherein the communication interface transmits notification information to the electronic device.

27. The server of claim 26, wherein the processor is further configured to:
provide, via a notification service interface, one or more reminders to the electronic device based on updated travel time, wherein a reminder comprises a notification for modifying future appointment time schedule based on updated traffic information and estimated travel time.

28. The server of claim 27, wherein:
the notification interface communicates to an event manager of the electronic device for automatically providing local maps and points of interest (POI) information based on travel plans;
the event manager creates a dynamic address book based on the POI information, enables temporary sharing of location data for locating contacts, uses favorite local POI information for applying to an appointment location for finding similar POI information in the appointment location, analyzes communication information and appointment location for determining POI suggestions and providing the suggested POI information on a map display, and tracks user behavior for obtaining the historical travel information; and
the historical travel information comprises one or more of travel time between locations, driving habits, and appointment punctuality.

29. A graphical user interface (GUI) displayed on a display of an electronic device, comprising:
an alarm display including suggestions related to services information; and
a scheduled event display including changeable update indications based on the services information and information showing impacts to the scheduled event, wherein the services information is obtained based on personal planned user daily event information previously entered into one or more applications executed by the electronic device.

30. The GUI of claim 29, wherein the alarm display is automatically updated based on the services information.

* * * * *